United States Patent [19]
Allen

[11] Patent Number: 5,652,627
[45] Date of Patent: Jul. 29, 1997

[54] SYSTEM AND METHOD FOR REDUCING JITTER IN A PACKET-BASED TRANSMISSION NETWORK

[75] Inventor: James Riley Allen, Naperville, Ill.

[73] Assignee: Lucent Technologies Inc., Murray Hill, N.J.

[21] Appl. No.: 312,599

[22] Filed: Sep. 27, 1994

[51] Int. Cl.$^6$ ........................................... H04N 7/10
[52] U.S. Cl. ........................ 348/497; 348/7; 348/13
[58] Field of Search ........................ 348/7, 497, 12, 348/607, 13, 17, 14; 375/118, 371; 370/108, 105.3, 94.1, 94.2; H04N 7/10, 7/14

[56] References Cited

U.S. PATENT DOCUMENTS

4,887,279  12/1989  Odenheimer ........................ 348/184

Primary Examiner—Safet Metjahic
Assistant Examiner—Nina N. West
Attorney, Agent, or Firm—Michael B. Johannesen

[57] ABSTRACT

A system and method for use in a video transmission network that regulates the timing of both the video signal and the audio signal regardless of the transport mechanism used to deliver the digitized audio and video signals from the source to a set top box, comprising replacing a program clock reference when it is present in ones of the audio and video transport packets with a new time derived from a high reliability source. A constant value is then derived from the new PCR value to be added to a program time stamp and a decode time stamp, if present, and the buffer size is increased merely by the amount of the constant times the bit rate of delivery of the packets.

12 Claims, 4 Drawing Sheets

SYSTEM AND METHOD FOR REDUCING JITTER IN A PACKET-BASED TRANSMISSION NETWORK

TECHNICAL FIELD

This invention relates to the field of transmission of video signals, and, more specifically to the area of eliminating transmission jitter in digital video transmission networks.

BACKGROUND OF THE INVENTION

In the near future, movies and other program material will be available at a customer's home television set at the request or "demand" of the customer, without the customer having to leave home to get tapes or disks, and then return them later. The customer will merely select an item from a menu or enter a code into a box at home, and the program will be delivered over a line connected to a set top box (commonly called a cable converter) on the customer's television set.

Such universal (or nearly universal) video-on-demand requires that massive amounts of data be multiplexed onto cables shared by many customers. In such a system, data will be digitally stored and transmitted as needed over high capacity (wide bandwidth) transmission facilities to local cable operators. The local cable operators will then re-transmit the data to a set top box for the specific customer. Each set top box must be able to receive data and then process it so that a continuously high-quality audio and video program is produced.

In order to deliver all of the information necessary to produce both audio and video at a television, the industry has proposed a standard for digitally storing, transmitting, and then reproducing such video material, namely International Standard ISO/IEC JTC1/SCZ9/WG11, known as Moving Picture Experts Group (MPEG) standard, number 2 (commonly called "MPEG-2"), dated Jun. 10, 1994. The MPEG-2 standard describes a system for digitally describing audio and video program material.

A primary concern of MPEG-2 is that the decoder be able to function with a minimum amount of buffer memory. Since prevention of data underflow and overflow in the buffer can only be accomplished by exactly matching the rate of consumption of data from the buffer to the rate of data delivery to the buffer, the decoder clock frequency must exactly match the transmission facility clock frequency. A further concern of MPEG-2 is that the transmission facility be able to use an inexpensive clock, which is of limited accuracy. Hence, MPEG-2 defines a program clock reference (PCR) time stamp in its data stream in order to regulate the decoder clock and, thus, the data consumption rate from the buffer. This regulation is accomplished by the decoder comparing the numeric value of the PCR to the numeric value of its own clock at the moment of the PCR's arrival to produce a decoder frequency adjustment signal. MPEG-2 also defines a presentation time stamp (PTS) to specify the time at which each picture is to be displayed, and a decode time stamp (DTS) to specify the time at which a picture is to be decoded when the decode time differs from the presentation time.

The implication of the above solution to coordination of data transmission and use is that MPEG-2 assumes a transport network with a uniform transit time. However, it is known that packet networks, which are anticipated to transmit MPEG-2 data, commonly utilize variable transit times to resolve packet collisions. This transit time variation manifests itself as a numeric error, which is herein called "jitter," in the PCR value at the moment of arrival of a magnitude that makes decoder clock regulation using ordinary techniques difficult.

Therefore, a problem in the art is that there is no way to correct the jitter in delivery of MPEG-2 data introduced by a packet network.

SUMMARY OF THE INVENTION

This problem is solved and a technical advance is achieved in the art by a system and method that regulates the PCR accuracy of both the video signal and the audio signal regardless of the transport mechanism used to deliver the digitized audio and video signals from the source to the set top box. This invention, in one embodiment, comprises replacing the PCR value when it is present in ones of the audio and video transport packets after receipt from the transport network with a new time value derived from a different source. A constant value is then derived from the new PCR value to be added to PTS and the DTS time stamps. Advantageously, the TV vertical sync signals may be synchronized across all video channels simply by rounding the above constant to the next multiple of the frame rate (with a suitable but small increase in buffer size) with no additional processing. Also, a difference in frequency between the clock in the sender of the video data and the clock used to retime the video data may be tolerated and allowed for by adding yet another term to the above constant (again with suitable, small increase in buffer size).

BRIEF DESCRIPTION OF THE DRAWING

A more complete understanding of the invention may be obtained by a consideration of the following description in conjunction with the drawings in which.

DETAILED DESCRIPTION

For mathematical convenience, time is expressed, unless otherwise stated, in terms of "ticks" of a 90,000 Hz clock. (This is the maximum resolution of all PTS and DTS time stamps and is also the high order 33 bits of the longer PCR time stamp.) The rate at which MPEG-2 data is transmitted through the network will be denoted as R bits/tick. The time required for a packet to transit the network will be denoted as T+d ticks, where T is assumed to be constant for all packets and d is assumed to vary from packet to packet between 0 and some maximum value D. The difference between the values of two clocks (here called phase error) will always be expressed in units of 90 KHz ticks.

According to the MPEG-2 standard, video is described as a sequence of highly compressed digital video pictures, and audio is described as a sequence of compressed digital audio frames. Multiple audio frames and video pictures can be multiplexed together and transmitted through a network to a set-top box where they are demultiplexed, decoded and synchronized for display. To this end, the video pictures (which are very data intensive) are encoded as one of three different types: I, P, and B pictures. I-pictures contain a full, though greatly compressed, description of a single picture. P-pictures describe only the differences between the P-picture and one transmitted earlier, thus requiring fewer data bytes than an I-picture. B-pictures are described in terms of both an earlier and a later picture, requiring even fewer data bytes than a P-picture (B-pictures are typically an order of magnitude smaller than I-pictures). A B-picture, therefore, requires that some picture to be shown after (later in time) the B-picture must actually have been transmitted out of sequence (earlier in time). MPEG-2, therefore defines a sequence number in each picture description which is used by the decoder to reconstruct the proper display sequence of pictures.

MPEG-2 also addresses the problem of playing the program on a remote device (e.g., set top box), which is able to buffer no more than one second of program material. Such relatively small buffers require careful timing of the delivery of video and audio data to the decoder so that there is always data in the decoder buffer when it is needed for playing, but so that data never arrives early enough to cause the buffer to overflow.

However, success in compressing individual pictures (as described above) has made proper timing of the delivery of data more complicated. Data is normally delivered to the decoder's buffer at a fairly constant bit rate (such delivery being limited by the link channel bandwidth) but exits the buffer in a very bursty fashion, due to the large difference in picture sizes among I, B, and P pictures. The amount of data ("fill level") in a minimally-sized decoder buffer (the one-second buffer), therefore, fluctuates widely and provides no help in coordinating the arrival of data with the displaying of the pictures.

The semantics of MPEG-2 data fields and actions are defined in terms of a hypothetical, idealized decoder called the System Target Decoder (STD). The three main elements of the STD are two first-in-first-out (FIFO) buffers (one for video and one for audio) and a decoder clock. Each buffer is fixed in size and holds incoming data until it is decoded. The decoder clock is a 42-bit register incremented at a rate of 27 MHz. A first 9-bit portion of the register increments modulo-300 at the full 27 MHz rate. Each time the 9-bit register wraps to zero, a second, 33-bit portion of the register is incremented. The 33-bit register, which increments at 90 KHz, is used to synchronize the decoding and display of program material.

Each MPEG-2 picture and audio frame is tagged (explicitly or implicitly) with a Decoding Time stamp (DTS) which indicates the (33-bit) value of the STD clock at which the picture or audio frame should be decoded. If a DTS for a particular picture or audio frame is not explicitly coded in the MPEG-2 bit stream, then that picture or audio frame is decoded immediately following the previous one. Both pictures and audio frames are always transmitted in order of increasing DTS values.

Because MPEG-2 requires some pictures to be transmitted several pictures earlier in sequence than they are to be shown (i.e., prior to a B-picture), these pictures also require a second time stamp called the Presentation Time Stamp (PTS) which indicates the STD clock value at which the picture is intended to be shown. If only a single time stamp is coded (as is always the case with audio), it is assumed to be both the DTS and PTS. Beginning both the video and audio at the time indicated in their respective PTS fields ensures synchronization (lip sync) of the audio and video.

The smallest element of an MPEG-2 data stream is 188 bytes in size and called a Transport Stream (TS) Packet. Transmission of these packets over an asynchronous transfer mode (ATM) network (generally presumed by the industry to be the transmission network of choice for MPEG-2 TS packets) requires an encapsulation of the TS Packets into a series of smaller (54 bytes) ATM cells. Thus, any server which delivers MPEG-2 packets to an ATM network breaks up the TS packets, which must then be reassembled at the other end.

If an entire movie were stored locally in the decoder's buffer, then the MPEG-2 picture and audio frames with their DTS and PTS time stamps would contain all of the information needed to generate synchronized video and audio outputs. In this scenario, a decoder theoretically needs only to set its local clock to approximately the same value as the first time stamp, and then increment the local clock at a rate of approximately 90 KHz to govern the rate of play. Some integrated storage and display systems (i.e., CD-I players) may actually do this, using a simple virtual memory technique to make the decoder buffer appear to be infinitely large and already loaded with the movie.

In reality, however, the amount of data required to describe even a greatly compressed movie is enormous (multiple gigabytes), whereas the MPEG-2 standard requires that the STD be required to buffer no more than 1 second of program material at a time. Further, since video data is expected to arrive at a fairly even rate, but is consumed by the decoder at a highly variable rate (due to the large difference in picture sizes), the amount of data in the compressed video buffer varies rapidly between nearly full and nearly empty.

In order to address the inconsistency between the data arrival rate and the data consumption rate, the MPEG-2 standard defines another hypothetical decoder called the video buffering verifier (VBV). Any MPEG-2 video encoder must guarantee not to cause this hypothetical decoder's buffer to overflow or underflow. The VBV model allows buffer occupancy to vary between completely full and completely empty and assumes that all data describing a given picture is removed instantaneously from the VBV buffer precisely at the time of the DTS.

Figure 1:
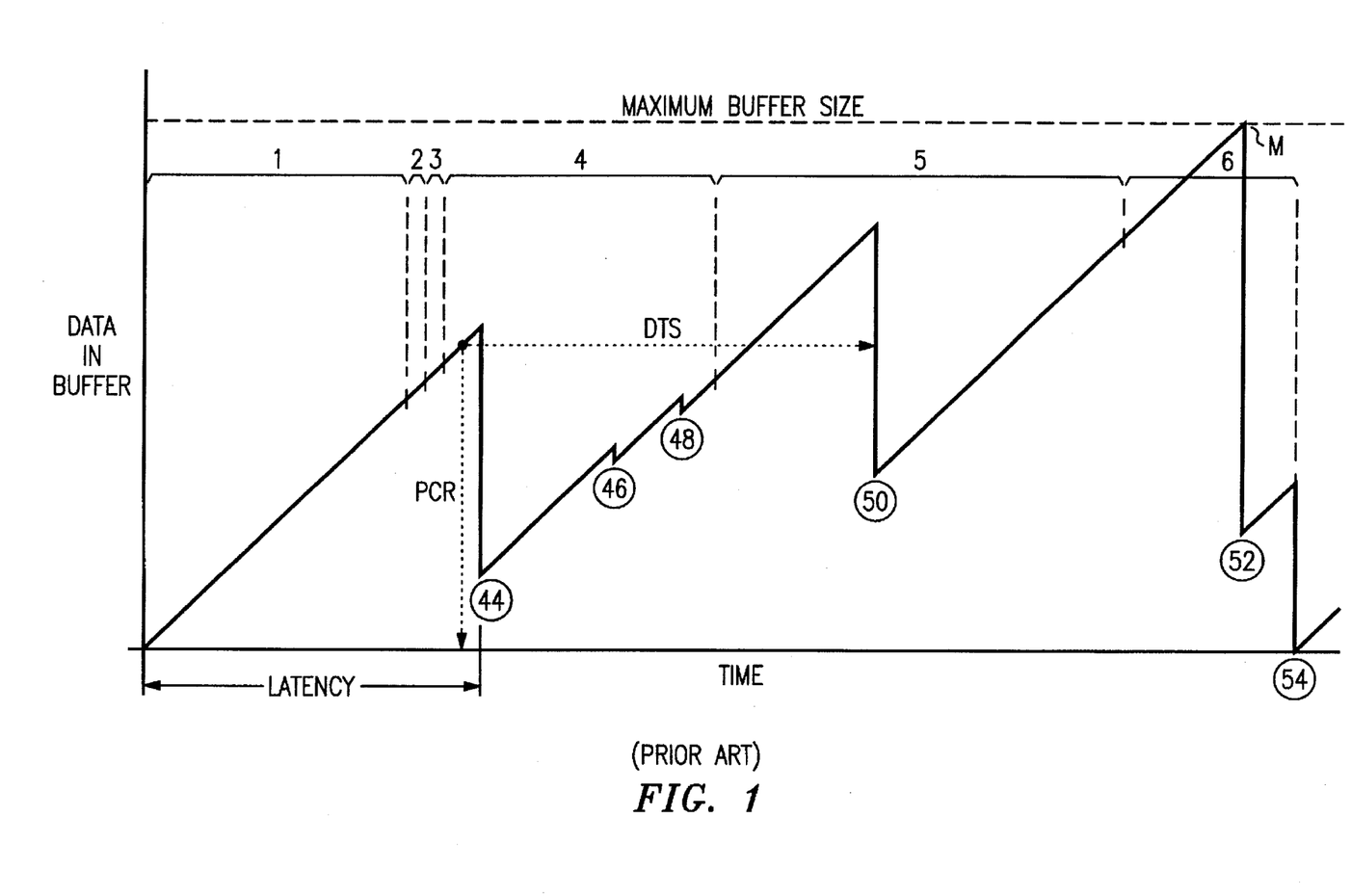
FIG. 1 is a graph illustrating the prior art coordination of arrival and decoding of data in an idealized decoder video data buffer.

FIG. 1 shows a graph of a VBV buffer occupancy as a function of time. The numbers over the brackets at the top indicate picture transmission intervals. Picture No. 1 arrives during the time bracketed by No. 1, and so forth. Picture 4 arrives subsequent to 3 and is a long data packet (an I-picture), as is data packet 5. The latency period (marked at the bottom of the graph) indicates the period of time which must lapse before the first picture may be decoded without causing buffer underflow. In the illustration of FIG. 1, the data for picture 1 is removed at 44. The data for picture 2 is removed at 46, 3 is removed at 48, etc. Note that during the reception of picture 6 the buffer becomes completely full at precisely the instant the data from picture 5 is removed at 52. Note also that when picture 6 is removed from the buffer at 54 the buffer is completely empty as no part of picture 7 has yet been received.

As can be summized from this figure, accuracy of the decoder's clock is critical. The decoder's clock alignment (phase) is critical to avoiding buffer overflow and underflow. The decoder's clock frequency is also important because frequency errors eventually become phase errors. Playing video within the constraints of the limited VBV buffer size requires that the 90 KHz clock in the decoder be precisely coordinated with the arrival of data at the video decoder. If the decoder clock value is too low (slow) then the VBV buffer will overflow whenever the VBV buffer is to be filled completely (e.g., at M). If the decoder clock value is too high (fast), then the data needed to decode a picture is not yet in the decoder buffer (underflow) whenever the VBV buffer is to empty completely (e.g., at 54).

To relax the stringent requirement for precisely accurate decoder clock phase and instead tolerate a limited amount of clock phase error (+/−X ticks), a decoder manufacturer could take the following steps. Simply increasing the decoder video buffer size by X*Rv bits (Rv is the peak transmission rate of the video data component and will be slightly less than the total composite data rate of R) makes the decoder immune to any lagging clock phase error from 0 to −X ticks. Providing immunity from 0 to +X ticks of leading clock phase error can be accomplished by delaying decoding of the video data by X ticks which then, in turn, requires another X*Rv of additional buffering. Therefore, adding X ticks of decoding delay combined with the addition of 2X*Rv bits of video buffering will allow the decoder to tolerate +/−X ticks of phase error in the decoder clock. Similarly 2X*Ra (where Ra is the peak transmission rate of the audio data component) of additional audio buffer and X ticks of additional audio delay will do the same for the audio program. (The magnitude of Ra will normally be an order of magnitude less than Rv, however, the MPEG-2 standard does not guarantee this.)

Figure 2:
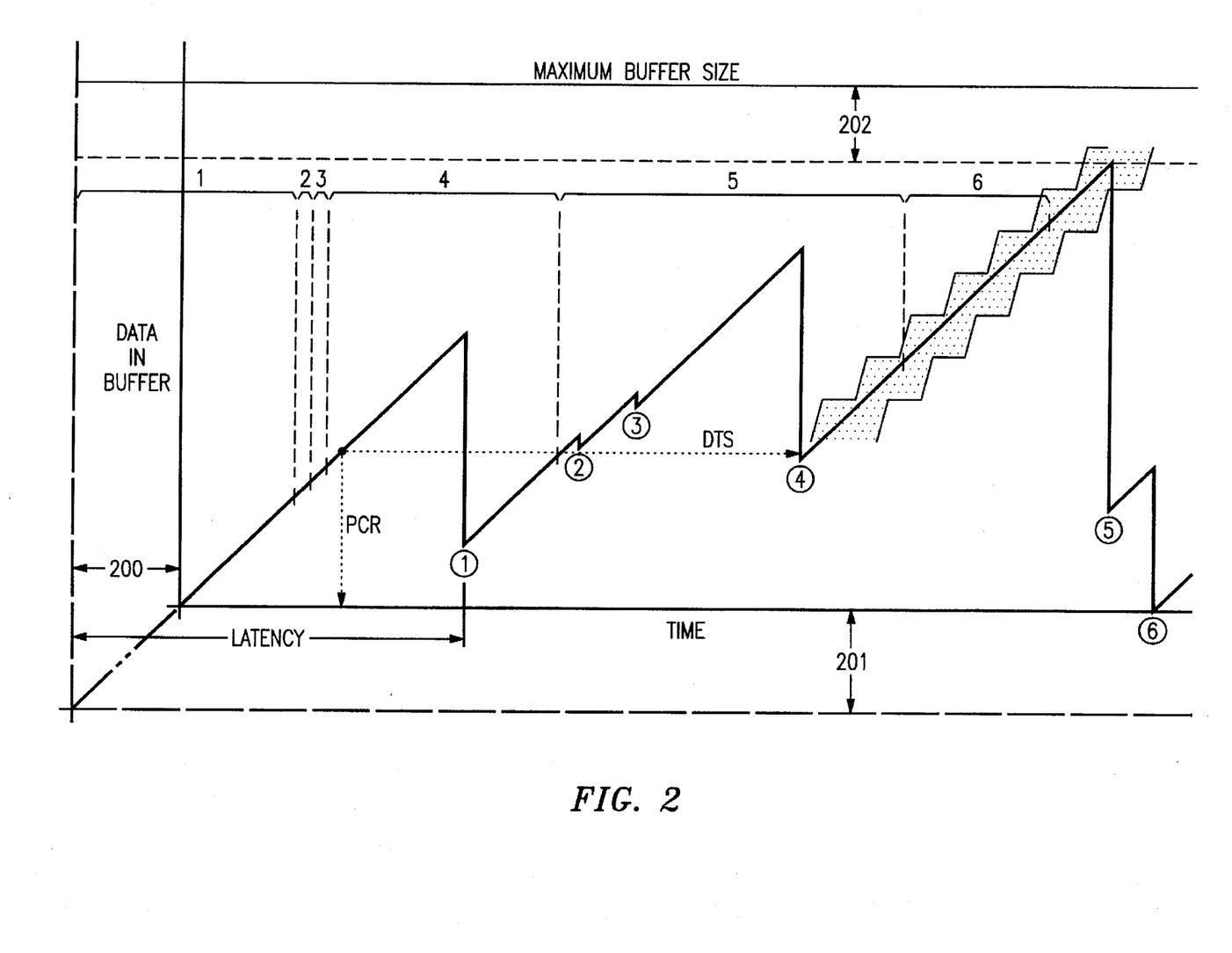
FIG. 2 is a graph of the decoder video data buffer of FIG. 1, where picture decoding has been delayed.

FIG. 2 shows the VBV buffer occupancy for the same data stream used in FIG. 1 after the above procedure. Decoding has been delayed by X ticks at 200 (increasing the latency). The buffer size has been increased by X*Rv bits at 201 and again at 202 for a total increase of 2X*Rv bits. Extra buffer size can be accomplished either by adding physical memory to the decoder or by causing the encoder to generate data which assumes a smaller VBV buffer size. Extra decoding delay can be accomplished either by causing extra delay in the decoder or by increasing all DTS and PTS values by a uniform amount relative to the PCR values.

As stated above, data retrieval, transmission, and retransmission can all add uncertainty in data arrival time. Such errors in data arrival time require the same operations as needed to tolerate phase errors. That is, data arriving too soon (i.e., by D1 ticks) can be tolerated by adding (R*D1) bits of decoder memory to avoid buffer overflow. To tolerate data arriving too late (by D2 ticks), decoding can be delayed by D2 to insure that a display unit (picture or audio frame) has arrived before it is to be played (which requires adding RD2 bits of memory to avoid buffer overflow caused by the decoding delay).

Unlike phase error, however, where a single unit of phase error virtually guarantees an eventual buffer overflow or underflow, a single delayed packet has a low probability of causing overflow or underflow provided that the packet does not arrive at a sensitive time (e.g., precisely at 52 or 54). If the decoder clock were initialized from a packet which had experienced minimum network delay, then each subsequent packet would exhibit a relative delay between 0 and some maximum positive value (D). Similarly, if the decoder's clock were initialized from a packet that experienced maximum network delay, then each subsequent packet would exhibit a relative delay between -D and 0. Therefore, if a decoder clock is initialized from a PCR value in a packet experiencing an indeterminate amount of relative delay, which is between 0 and D, then all later data exhibits a relative delay bounded by −D and +D. Tolerating such delay (±D) requires 2R*D bits of additional memory and D ticks of additional delay.

Decoder clock frequency error presents a problem for MPEG-2 because a sustained error in the decoder clock frequency causes a slowly mounting accumulation of decoder clock phase error. Not even the smallest amount of decoder clock frequency error can be tolerated forever. Video program material, however, usually has a limited interval of interest (e.g., about two hours for a typical movie). Longer video material could be subdivided into a series of (arbitrarily long) intervals between which decoder clock resynchronization could occur.

The product of the length of the longest program segment times the maximum frequency error to be tolerated will yield the maximum amount of decoder clock phase error (+/−B ticks) which can possibly be accumulated over the course of a video program. A decoder with no phase error at the beginning of a program will never have more than +/−B ticks of phase error at the end of the program. The decoder can be made to tolerate this amount of frequency error by adding B ticks of decoding delay and 2B*Rv bits of additional video buffer as described above.

A readily apparent property of MPEG-2 is that any program can be shifted in time (phase) relative to the decoder's local clock by simply adding the same value to every PCR, DTS, and PTS time stamp in the data stream. (MPEG-2 is sensitive only to the "relative" values of PCR and PTS/DTS time stamps which are preserved by this operation.) Adding any appropriate constant value to every occurrence of each of the three time stamps within a movie could phase shift the source material to fit an already existing decoder clock's phase. This would eliminate the need to introduce a discontinuity into the decoder clock phase at the beginning of the MPEG-2 video sequence as would normally be required to when changing from one MPEG-2 source to another. Such a discontinuity in the PCR sequence can be very disruptive the operation of the decoder.

A second arithmetic property of MPEG-2 encoding is that any constant value (X) subtracted from every PCR in the video sequence has the effect of delaying decoding of the sequence by exactly X ticks. (This necessitates the addition of R*X bits of additional video buffering as describe above.) This property makes it possible for a network element to affect the decoding delay without enlisting the cooperation of the decoding device itself.

Independently generating a sufficiently accurate clock frequency reference within the decoder would require exotic techniques (e.g., double oven temperature control) and cost hundreds of dollars per decoder. For the purpose of achieving a highly accurate (yet low cost) decoder clock, MPEG-2 has defined a Program Clock Reference (PCR) time stamp. The PCR time stamp contains the exact numerical (full 42-bit) value that the decoder's clock should have at the moment that the PCR time stamp arrives at the decoder. A PCR value is required by the standard to be transmitted at least 10 times per second. The decoder is expected to use these PCR samples to adjust the rate of its local clock, using Phase Lock Loop (PLL) techniques, so that the decoding clock rate precisely matches the rate at which data is arriving. The PLL provides that, as the arrival time drifts from what is expected, the clock can speed up or slow down. This adjustment and technique is intended to permit the decoder to adapt to slow variations in the video server's clock frequency as well as adapt to differences between server clock rates.

The use of periodic PCR values within the MPEG-2 bit stream to regulate the decoder's clock frequency assumes a condition which is difficult to guarantee in a packet network (e.g., ATM network); that is, that two PCR values which differ numerically by P will arrive at the decoder separated by exactly P ticks of the 90 KHz clock. (The PCR represents a 27 MHz clock by subdividing a 90 KHz signal by 300.) A video server feeding a constant packet rate to a network (with a bit rate of R bits per tick) could meet this condition easily by sending the PCR values precisely (P*R) bits apart, only to have the PCR accuracy compromised by delay variation in the packet network.

Packet networks, as known in the art, intentionally delay selected packets in order to resolve packet collisions in the network. These delay variations, when they affect packets containing PCR values, manifest themselves as numerical errors in the correction value input to the PLL. Such delay variability increases with network traffic and accumulates over network stages. While any practical PLL design must tolerate some error in its calibrating signal, the amount of delay variation which may be introduced by an ATM network (several msecs) could lead to very long frequency acquisition times and poor decoder clock frequency stability. Furthermore, set-top-boxes, are very price-sensitive and need to keep PLL costs as low as possible.

As stated above, the term jitter refers to differences between the numeric value of a PCR time stamp and the actual time that it arrives at the decoder for purposes of this application. A packet network is certainly not the only potential source of such jitter in an MPEG-2 system; and therefore, any method devised to specifically avoid introducing jitter by the network is of limited value because jitter introduced from all other sources will remain. Other significant sources of jitter are in the video servers themselves, especially servers designated to produce a large number of program outputs. Jitter arises in video servers either from bursting data or modulating packet intervals to achieve the proper "average" bit rate. Also, any device which multiplexes multiple MPEG-2 streams onto a single physical link causes jitter by the nature of multiplexing. Such jitter may occur within a server or within the packet network itself. Any device which reassembles ATM cells into MPEG-2 TS Packets causes jitter. Further, any device which interfaces a high speed MPEG-2 link, to a lower speed link causes jitter.

Figure 3:
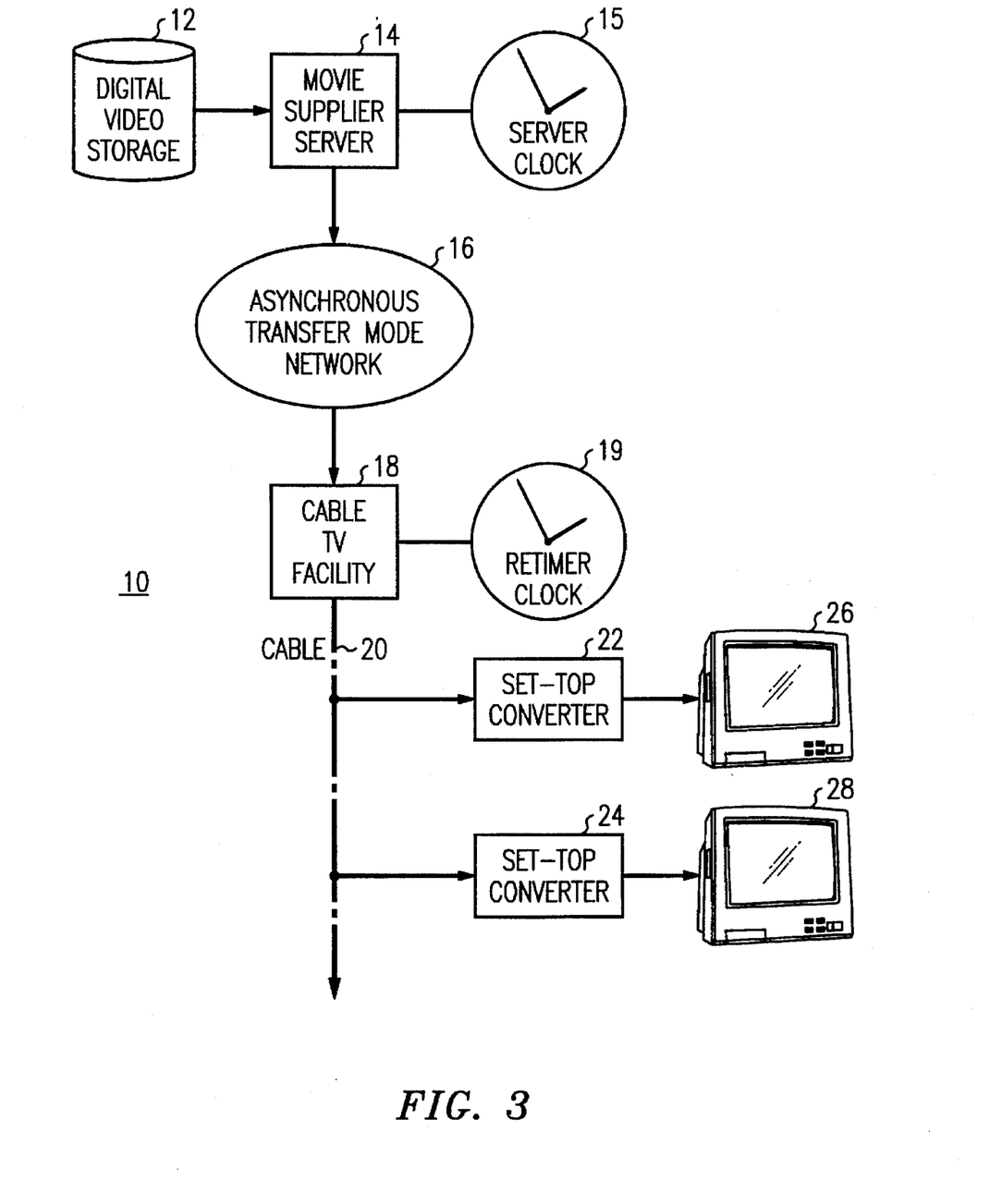
FIG. 3 is a block diagram of a video on demand system in which an exemplary embodiment of the current invention operates.

FIG. 3 is a block diagram illustrating a transmission network for a video on demand system 10. Such video on demand systems include a digital storage medium 12. The illustrated medium 12 is presumed to be a disk system, as is known in the art. Other digital video storage media such as CD ROM, massive random access memory arrays, or other media may be used. Movies are retrieved from storage medium 12 by a movie supplier server 14 which prepares the digitized video and audio for transportation to its destination. In this exemplary embodiment, the server encapsulates the digitized video for transport in an ATM network 16, but this invention may be equally applicable in any packet network.

To retrieve and send the program material, movie supplier server 14 uses server clock 15 to govern the rate at which data is delivered to the network (R bits of data for each tick of the 90 KHz clock 15). In practice, clock 15 will often be some precise multiple of 90 KHz, providing data to the network, in short bursts or packets. Since methods for precise clock frequency conversion are well known in the art, we will assume the frequency of clock 15 to be 90 KHz in order to simplify this discussion.

According to MPEG-2, supplier server 14 must deliver PCR time stamps at precisely defined time intervals. If the process of packetizing the data, by the server for transmission through the network, does not preserve the temporal spacing of the PCR time stamps, then the server itself becomes a source of PCR jitter. Therefore, it is helpful to have server clock 15 as accurate as possible.

Server 14 addresses the ATM cells and sends them through ATM network 16. ATM network 16 distributes the packets to their destination, which in this exemplary embodiment is a cable TV facility 18. Cable TV facility 18 removes the ATM capsules and reassembles the video packets for transmission over cable 20 to set top box converters 22, 24. This may include RF modulation of the digital data (via pulse code modulation, frequency shift keying or quadrature amplitude modulation, as are known in the art), so that current analog TV cable and other distribution facilities can be used.

Between cable TV facility 18 and any set top converter 22, MPEG-2 packets experience uniform delay and this part of the data path is not normally a source of PCR jitter. Therefore, if jitter can be removed in the cable TV facility 18, then the data stream will remain jitter free at the set top converter.

There are many places in this stream of digitized video wherein jitter may be introduced. For example, reading the stored digital video data from the storage media can introduce jitter. Additionally, an ATM network inherently adds jitter due to its bursty nature, as is known in the art. Furthermore, any multiplexing of digital video packets also delays selected packets in order to resolve collisions. Since the MPEG-2 standard requires that the PCR value be equal to the value of the local clock at the moment the time stamp is received, delaying a cell containing a PCR value by definition introduces error. Therefore, a system is needed to remove jitter from delivery of the data packets.

Figure 4:
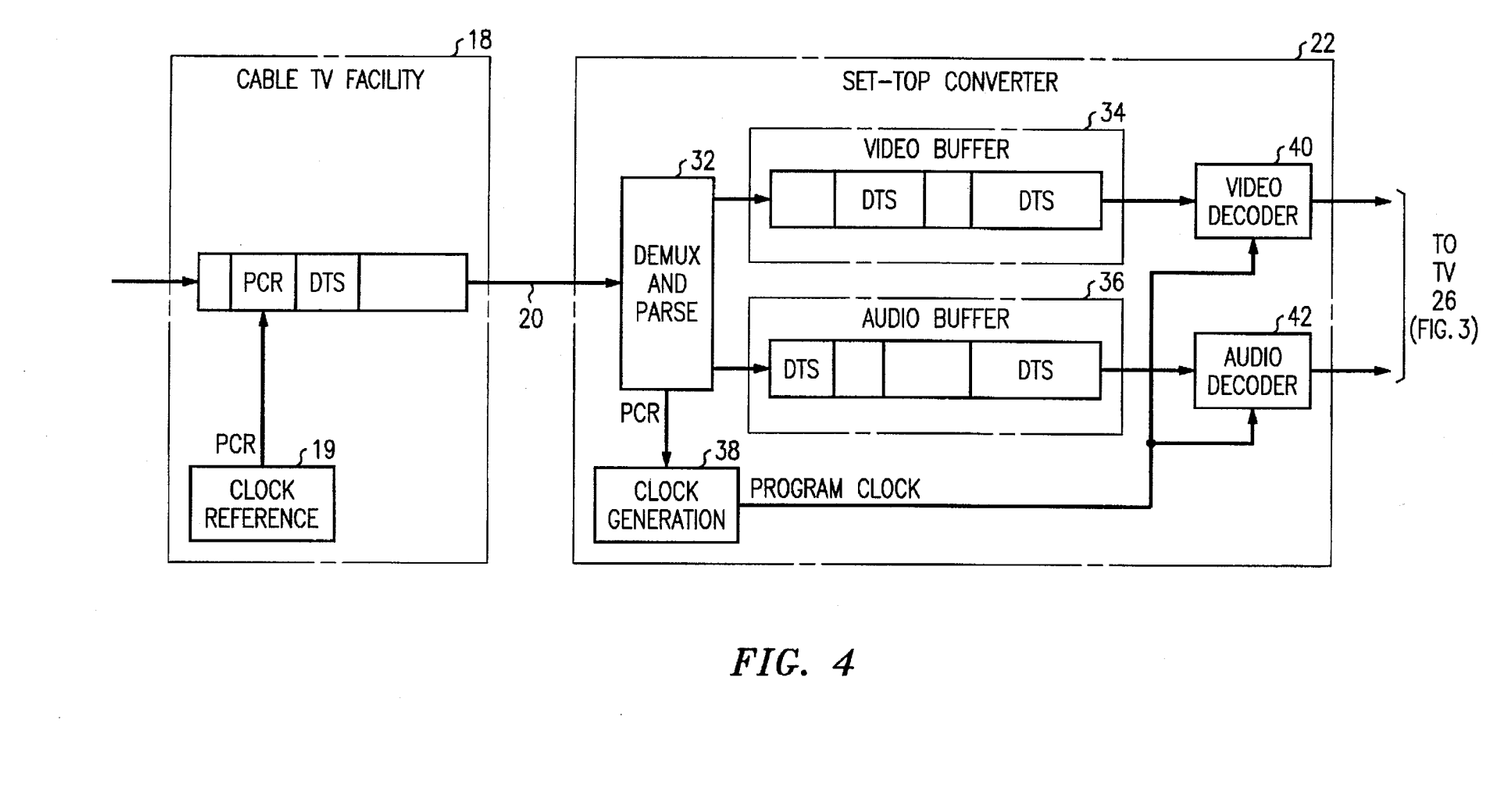
FIG. 4 is an example of the cable TV facility according to FIG. 3 wherein an exemplary embodiment of this invention may be implemented.

Turning now to FIG. 4, a cable TV facility 18 and set top box 22 are illustrated operating on an MPEG-2 transport stream (TS) packet. As stated in connection with FIG. 3, cable TV facility 18 receives ATM cells and reassembles them into 188 byte TS packets. All PCR jitter may be completely removed from an MPEG-2 transport stream while maintaining a viable relationship between the PCR and DTS/PTS time stamps. This can be done in any packet network with transfer rate of R and cell transit time of T+d, where T is constant and $0 \leq d \leq D$, without modification to any variable transmission element (such as asynchronous transport mode network 16), thus maximizing architectural flexiblity and reducing cost and complexity. The procedure for removing PCR jitter includes:

1. Supplying a stable and reasonably accurate frequency reference to a time source located at a downstream point beyond all variable-delay network elements, such as retimer clock 19 (FIG. 3). The absolute value of clock drift between retimer clock 19 and the server's clock 15 must be less than or equal to B over the longest time between any two program discontinuities.

2. Increase MPEG-2 phase error tolerance sufficiently to allow up to plus or minus (D+B) in phase error due to PCR jitter and clock skew. Increase size of both audio and video buffers by 2R*(D+B). (The audio buffer does not necessarily need to be increased by this full amount, provided that the burstiness of the audio output of the encoder is limited by its design). Delay decoding of both audio and video by D+B.

3. Use the first PCR time stamp following each discontinuity to calculate the offset between the retimer clock and the clock phase intended for decoding. Calculate the value Φ to be equal to the value of the first PCR time stamp received, minus the value of the decoder's local clock at the moment it arrives. The value Φ therefore, represents the phase difference between the sending and receiving clocks (15 and 19).

This offset Φ will only be accurate within +/−D ticks at the moment it is calculated (due to delay variations) and may drift to an accuracy of +/−(D+B) ticks by the end of the movie (due to any frequency difference between clocks 15 and 19). Both of these clock phase errors are now within the decoder's phase error tolerance introduced above.

4. Use offset Φ to calculate replacement values for all future PCR time stamps encountered. (It is important to use the same value of Φ to adjust both audio and video PCRs in order to maintain audio/video synchronization.

Replacing all future PCR time stamps by Φ plus the instantaneous value of the decoder clock is one (of several) ways to produce the non-jittered PCR sequence. Notice that subtracting a value (X) from Φ will cause decoding to be delayed by X ticks. This technique can be used to cause the decoding delay required above in step 2 without incurring any hardware cost.

If GEN-LOCK (the synchronization of pictures across video channels programs) is desired, then both audio and video buffers must be increased additionally by R*F (where F is the picture period in 90 KHz ticks, e.g., a period of 3,000 ticks corresponds to 30 frames per second), the offset constant Φ must be rounded up to the next higher integer multiple of F and all original source material constrained to begin with the same PTS value (e.g., zero).

The four basic operations for removing PCR jitter can each each be accomplished in any of several ways. This section describes options for each of these operations and suggests a notation for the classification of implementations.

The four basic operations are:
1. Increase size of decoder buffer relative to VBV buffer size:
    A. Add physical memory to decoder audio and video buffers.
    B. Direct encoder to encode source material for a smaller VBV buffer size.
2. Delay picture and audio frame decoding relative to PCR sequence:
    A. Increase DTS/PTS time stamp values in a retimer element.
    B. Decrease PCR time stamp values in a retimer element.
    C. Send increased DTS/PTS and/or decreased PCR time stamp values from video server, employing:
        1. Hardware in video server.
        2. Encoder.
        3. Postprocessing of encoded data.
    D. Increase DTS/PTS and/or decrease PCR time stamp value in the decoder.
    E. Add delay in decoder hardware.
3. Operate a stable clock at approximately 27 MHz (arbitrary phase) in retimer node:
    A. Locate retimer at edge of the network (i.e., in cable TV facility 18).
        1. Synchronize retimer to a network frequency reference.
        2. Generate frequency locally using precise circuit techniques (e.g., double oven temperature control).
    B. Locate retimer clock together with decoder. (Synchronize clock using out-of-band reference.)
4. Replace all jittered PCR time stamps with jitter-free samples derived from the local retimer clock.
    A. Phase shift all incoming DTS/PTS time stamps to fit retimer clock phase and replace every PCR time stamp with a direct sample of the retimer clock.
    B. Replace every PCR time stamp with a sample of the retimer clock that has been phase shifted to fit the incoming DTS/PTS time stamps.

One combination of the above alternatives which is particularly good for retiming because it has the added advantage of eliminating PCR discontinuities entirely (even when changing channels in a set top box converter) can be described as 1A-2A-3A-4A. This implementation places no requirements upon either the encoder or decoder beyond providing a small amount of additional buffering. It standard does not permit encryption of PCR time stamps, but does not specifically outlaw encryption of the DTS and PTS time stamps). Under this option, every program on every RF channel of an entire CATV cable plant would reach the decoder with the same PCR clock phase. The decoder PLL would see a perfectly jitter-free sequence of PCR time stamps with no discontinuities, even across channel changes.

A second possibility is 1A-2B-3A-4B. This implementation is very much like the first, except that the decoder will experience a PCR discontinuity each time the discontinuity indicator appears in the MPEG-2 data stream. Since the DTS and PTS time stamps are not touched in this approach, it can be used even in cases where these values are encrypted.

A further alternative embodiment involves 1A-2A-3B-4A. This approach may be attractive to set top box providers because it does not require special support from either the server or the network other than supplying a single out-of-band frequency reference. It is able to remove PCR discontinuities and also works with encrypted DTS and PTS.

It is to be understood that the above-described embodiments are merely illustrative principles of the invention and that many variations may be devised by those skilled in the art without departing from the scope of this invention. It is, therefore, intended that such variations be included within the scope of the claims.

I claim:

1. A method for reducing jitter, usable in a video system which transmits audio and video information data packets, said data packets being transmitted on a high speed packet network, said video system including a receiving system having a reference clock, said receiving system delivering received packets to a decoder, selected ones of said data packets including a program clock reference (PCR) value indicating a time when said PCR is to be received by said decoder, selected ones of said data packets including a presentation time stamp (PTS) value indicating a time when said data packet should be used by said decoder and a decode time stamp (DTS) value indicating when said data packet should be decoded at said decoder, said data packets being delayed by an amount of time T+d wherein T represents a constant time delay of transmission through said network and d is a positive integer representing a variable component of said delay, and said PCR drifts in relation to said reference clock by a predetermined amount of time B, a method for correcting said PCR, PTS and DTS so that said jitter induced in said high-speed packet network is not apparent at said decoder, said method comprising:

determining a constant comprising an initial difference between said reference clock and received PCR values plus a predetermined delay D and said predetermined amount of time B;

receiving a packet in said receiving system;

in response to said receiving system determining that said packet contains a PCR, said receiving system replacing said PCR with a time value from said reference clock at said receiving system;

in response to determining that said packet contains a PTS, said receiving system combining said constant to said value in said PTS; and in response to said receiving system determining that said packet contains a DTS adding said constant to said value in said DTS.

2. A method according to claim 1 wherein said constant is periodically recalculated.

3. A method according to claim 1 wherein said packets include digital data representing television signals and wherein said time value from said reference clock used to replace said PCR may be rounded off to 1/30th of a second to synchronize a vertical sync pulse across all channels.

4. A jitter-free system for transmitting data packets, said jitter-free system comprising a video server, a transport network connected to said video server, a receiving system connected to said transport network, and at least one decoder connected to said receiving system, selected ones of said data packets including a program clock reference (PCR) value indicating a time when said PCR is to be received by said decoder, selected ones of said data packets including a presentation time stamp (PTS) value indicating a time when said data packet should be used at said decoder and a decode time stamp (DTS) value indicating when said data packet should be decoded at said decoder, said system being characterized by:

means for delaying picture and audio frame decoding relative to said PCR sequence by modifying said DTS and PTS time stamp with jitter-free values and replacing said PCR with a locally derived value.

5. A method according to claim 4 wherein said video server includes said means for sending modified DTS and PTS time stamp values.

6. A method according to claim 4 wherein said decoder includes said means for modifying said DTS and PTS time stamp values.

7. A jitter-free system for transmitting data packets, said jitter-free system comprising a video server, a transport network connected to said video server, a receiving system connected to said transport network, and at least one decoder connected to said receiving system, selected ones of said data packets including a program clock reference (PCR) value indicating a time when said PCR is to be received by said decoder, selected ones of said data packets including a presentation time stamp (PTS) value indicating a time when said data packet should be used at said decoder and a decode time stamp (DTS) value indicating when said data packet should be decoded at said decoder, said system being characterized by:

means for replacing all PCR time stamps with jitter-free samples derived from a reference clock.

8. A method according to claim 7 wherein said reference clock includes means for synchronizing itself to a network frequency reference.

9. A method according to claim 7 wherein said reference clock includes means for generating a frequency locally.

10. A method according to claim 7 wherein said receiving system includes a retimer clock and said means for replacing all PCR time stamps comprises means for replacing all PCR time stamps with a sample of said retimer clock, which sample has been phase shifted to fit said incoming DTS and PTS time stamps.

11. A method according to claim 7 wherein said video server includes said means for replacing all PCR time stamps.

12. A method according to claim 7 wherein said decoder includes said means for replacing said PCR time stamp value.

* * * * *